United States Patent

Mizumoto et al.

[11] 4,326,576
[45] Apr. 27, 1982

[54] RUBBER COMPOSITION EMPLOYING SOFT BLACK AND A THERMOSETTING RESIN AND TIRES EMPLOYING SAID COMPOSITION

[75] Inventors: Yasuhiro Mizumoto, Hadano; Yukio Tozawa; Masatoshi Kozima, both of Hiratsuka; Masaru Hirai, Yokohama, all of Japan

[73] Assignee: The Yokohama Rubber Co., Ltd., Tokyo, Japan

[21] Appl. No.: 245,184

[22] Filed: Mar. 18, 1981

Related U.S. Application Data

[63] Continuation of Ser. No. 66,543, Aug. 15, 1979, abandoned.

[30] Foreign Application Priority Data

Aug. 25, 1978 [JP] Japan .................. 53-103567

[51] Int. Cl.³ .................. B60C 1/00; B60C 15/06; C08K 9/00
[52] U.S. Cl. .................. 152/356 R; 152/357 R; 152/362 R; 152/362 CS; 152/374; 524/496; 524/511
[58] Field of Search .......... 152/330 R, 357 R, 357 A, 152/362 R, 362 CS, 374, 354 R, 355, 356 R; 260/42.32, 42.47, 19 UA, 38, 3

[56] References Cited

U.S. PATENT DOCUMENTS

| | | | |
|---|---|---|---|
| 3,514,417 | 5/1970 | Bickel et al. | 152/330 R |
| 3,671,478 | 6/1972 | Doyle et al. | 260/42.32 |
| 3,746,669 | 7/1973 | Dunnom et al. | 152/330 R |
| 3,937,862 | 2/1976 | Dillenschneider | 152/374 |
| 4,139,040 | 2/1979 | Samoto et al. | 152/362 R |
| 4,250,939 | 2/1981 | Shibata et al. | 152/362 R |
| 4,285,381 | 8/1981 | Furukawa et al. | 152/362 R |

FOREIGN PATENT DOCUMENTS 53-4059 1/1978 Japan .

OTHER PUBLICATIONS

*Rubber Technology and Manufacture,* Chemical Rubber Co., 1971, pp. 174–188.

Primary Examiner—Edward C. Kimlin
Assistant Examiner—Lois E. Boland
Attorney, Agent, or Firm—Armstrong, Nikaido, Marmelstein & Kubovcik

[57] ABSTRACT

Disclosed is a high hardness rubber composition having a hardness of at least 92, which comprises 100 parts by weight of a rubber, 55 to 95 parts by weight of soft black having an average particle size of 40 to 80 millimicrons, 5 to 30 parts by weight of a thermosetting resin and a small amount of a curing agent, the sum of the amounts of the soft black and thermosetting resin being 60 to 100 parts by weight per 100 parts by weight of the rubber.

This high hardness rubber composition is advantageously used as a tire reinforcement for the rim cushion portion or for both the rim cushion portion and bead filler.

17 Claims, 3 Drawing Figures

4,326,576

RUBBER COMPOSITION EMPLOYING SOFT BLACK AND A THERMOSETTING RESIN AND TIRES EMPLOYING SAID COMPOSITION

This is a continuation of application Ser. No. 66,543, filed Aug. 15, 1979, now abandoned.

BACKGROUND OF THE INVENTION (1) Field of the Invention

The present invention relates to a high hardness rubber composition having an excellent processability and a tire prepared by using this rubber composition. More particularly, the invention relates to a high hardness rubber composition comprising a rubber and, incorporated therein, soft black, a thermosetting resin and a curing agent and a tire formed by using this rubber composition for a structural portion where a high rigidity is required.

(2) Description of the Prior Art

In order to increase the hardness in rubber compositions, large quantities of additives such as carbon black, sulfur and vulcanization accelerators have heretofore been incorporated. For example, it is possible to increase the hardness of a rubber composition, for example, to a level of at least 90 as measured by a JIS spring type hardness tester (hereinafter referred to as "hardness (JIS)"), by incorporating a large quantity of carbon black into a rubber composition. However, this rubber composition can hardly be put for a practical use because it cannot be processed for kneading uniformly in the desired manner, it requires a relatively large power load on the Banbury mixer and it is very difficult to wind the rubber composition onto a roll. Accordingly, in order to increase the hardness while eliminating this disadvantage, the amount incorporated of carbon black is reduced to a low level allowing practical application of the rubber composition and large quantities of sulfur and a vulcanization accelerators are incorporated. However, because of a high sulfur content, blooming of sulfur is caused in an extrudate when this rubber composition is extruded, though the processability at the mixing step is improved to some extent. Generation of blooming results in reduction of the productivity at the manufacture of tires or degradation of properties of products. Furthermore, the hardness (JIS) of this composition reaches its highest point at about 88.

In order to further increase the hardness of this rubber composition, it has been tried to incorporate a thermosetting resin. In this case, softening of the thermosetting resin is promoted by heat generated during the mixing step, and therefore, the processability during the mixing step is improved to some extent and a rubber composition having the hardness (JIS) of at least 90 can be obtained. However, if a thermosetting resin is incorporated into carbon black having an average particle size of 20 to 30 millimicrons (so-called hard black), though the mixing processability is considerably improved as pointed out above, the viscosity of the rubber composition is not reduced, and therefore, the extrusion processability is not improved and the adaptability of an extrudate of this composition to handling is drastically degraded. In case of a rubber composition formed by incorporating carbon black having an average particle size of 20 to 30 millimicrons and a thermosetting resin, the rigidity in the uncured state is extraordinarily higher than the rigidity of a rubber composition free of a thermosetting resin. Furthermore, the self-bonding property inherent of rubber is lost, and the adaptability to such operation as bonding or bending is drastically degraded and the moldability and quality of a tire including an extrudate of this rubber composition are remarkably reduced.

SUMMARY OF THE INVENTION

It is a primary object of the present invention to provide a high hardness rubber composition excellent in the mixing processability, extrusion processability and molding processability, which can be easily handled and processed and in which inherent properties of rubber are not degraded at all.

Another object of the present invention to provide a tire, particularly a radial tire, which includes such high hardness rubber composition as the rim cushion portion rubber or as the rim cushion portion rubber and bead filler and which is excellent in the durability, driving stability and riding comfortability.

In accordance with the present invention, these objects can be attained by a high hardness rubber composition comprising at least one rubber selected from the group consisting of natural rubber, diene type rubber and diene type copolymer rubber, a single vulcanizing agent for said at least one rubber, so-called soft black, a novolak type phenol or alkyl phenol thermosetting resin and a curing agent therefor, wherein said single vulcanizing agent is sulfur and wherein the average particle size of the soft carbon is 40 to 80 millimicrons, the amount of the soft black is 55 to 95 parts by weight per 100 parts by weight of the rubber, the amount of the thermosetting resin is 5 to 30 parts by weight per 100 parts by weight of the rubber, and the sum of the amounts of the soft black and thermosetting resin is 60 to 100 parts by weight per 100 parts by weight of the rubber.

The soft black used in the present invention has a relatively large particle size, a relatively small surface area and a relatively low reinforcing effect. The surface area of the soft black may be 25 to 50 m$^2$/g. Values of the average particle size and the surface area are as mentioned in "The Handbook of Rubber Industry" (Japan Rubber Society, 1973). The soft black, the average particle size of which is 40 to 80 millimicrons, may belong to such carbon black of which according to the classification system of ASTM D 1765-67 the hundred digits are 4 to 7.

The above rubber composition has a Mooney viscosity lower than 60 and a green strength lower than 10 Kg/cm$^2$ in the uncured state. Accordingly, the rubber composition is excellent in the mixing processability and extrusion processability and therefore, it can be easily processed and handled. Furthermore, since the hardness (JIS) is as high as 92 or more after curing, the composition is advantageously used for a tire, particularly as the rim cushion portion rubber or as the rim cushion and bead filler.

In accordance with the present invention, there is provided a tire comprising a carcass including a folded portion formed by folding the carcass at the bead portion toward the outside of the tire, a rim cushion portion rubber having a tongue-shaped section and being extended from the bead portion to the side wall so that said folded portion of the carcass is located inside the rim cushion portion rubber, and if necessary, a bead filler extended toward the side wall between the carcass and the folded portion of the carcass, said rim cushion portion or both the rim cushion portion and the bead filler being composed of a rubber composition having a hardness (JIS) of at least 92, which comprises at least one rubber selected from the group consisting of natural rubber, diene type rubber and diene type copolymer rubber, soft black, a thermosetting resin and a curing agent therefor, wherein the soft black has an average particle size of 40 to 80 millimicrons, the amount of the soft carbon is 55 to 95 parts by weight per 100 parts by weight of the rubber, the amount of the thermosetting resin is 5 to 30 parts by weight per 100 parts by weight of the rubber and the sum of the amounts of the soft black and thermosetting resin is 60 to 100 parts by weight per 100 parts by weight of the rubber.

The tire of the present invention is excellent in the durability and driving stability, and the present invention provides a radial tire very excellent in the riding comfortability.

By the term "Mooney viscosity" used in the instant specification and appended claims is meant a viscosity of an uncured rubber composition as measured by a Mooney plastometer. More specifically, a sample of a rubber composition is charged in a sealed vessel having a rotary disc at the center and maintained at 100° C., and after 1 minute's preheating of the sample, an L rotor is rotated for 4 minutes, and after lapse of the 4 minutes, the necessary torque will be indicated on a meter, the indicated value being called the Mooney viscosity.

The green strength is used as a factor indicating the rigidity of an uncured rubber composition. More specifically, a dumbbell-shaped test piece No. 1 specified by JIS (Japanese Industrial Standards) is cut from an uncured rubber sheet having a thickness of 2 mm by using dubbell cutting blade No. 1 specified by JIS, and the test piece is pulled at a pulling speed of 50 mm/min in an atmosphere maintained at 25° C. The green strength is expressed in terms of the strength exerted when the test piece is elongated by 10%.

The hardness (JIS) of a cured rubber composition is measured by a spring type hardness tester. More specifically, as described in JIS K6301 (1962), a sheet having thickness of at least 12 mm, which has been cured under predetermined curing conditions is used as a sample, and a pressing face of the spring type hardness tester is lightly contacted with the sample, and a value indicated on the tester is read.

DETAILED DESCRIPTION OF THE PREFERRED EMBODIMENTS

Figure 1:
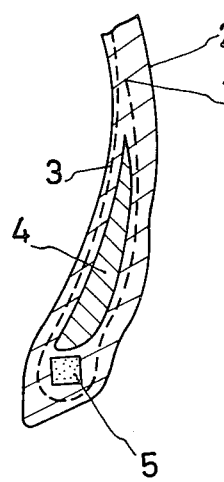
FIGS. 1 and 2 are cross-sectional views, each showing a part of a conventional tire in the region of from the bead portion to the side wall.

As the rubber as the base of the composition, there is preferably employed natural rubber, diene type rubber, diene type copolymer rubber or a mixture comprising two or more of these rubbers at an optional ratio. More specifically, a sulfur-curable rubber selected from natural rubber, butadiene rubber, styrene-butadiene rubber and a mixture formed by two or more of these rubbers at an optional ratio is preferably employed as the rubber in the present invention.

The soft black is a kind of carbon black. According to the average particle size, carbon black is roughly divided into so-called hard black having a smaller particle size and soft black having a larger particle size. Hard black is ordinarily used as a rubber reinforcement. For example, hard blacks such as Super Abrasion Furnace (SAF) having an average particle size of 14 to 27 millimicrons, Conductive Furnace (CF) having an average particle size of 20 to 30 millimicrons, High Abrasion Furnace (HAF) having an average particle size of 26 to 35 millimicrons and Medium Processing Channel (MPC) having an average particle size of 24 to 30 millimicrons have heretofore been as the rubber reinforcement.

The soft black used in the present invention has an average particle size of at least 40 millimicrons, more specifically 40 to 80 millimicrons. Examples of the soft black are shown in Table 1.

TABLE 1

| Type of Soft Black | Average Particle Size (mμ) | Surface Area (m²/g) | Nomenclature of ASTM |
|---|---|---|---|
| Fine Furnace (FF) | 40~50 | 50~40 | N-440 |
| Fast Extrusion Furnace (FEF) | 40~45 | 45~40 | N-550 |
| High Modulus Furnace (HMF) | 60 | 40~30 | N-601 |
| General Purpose Furnace (GPF) | 50~55 | 30~25 | N-660 |
| All Purpose Furnace (APF) | 60~80 | 30~25 | N-683 |
| Semi Reinforcing Furnace (SRF) | 60~80 | 30~25 | N-761, N-762, N-770, N-774 |
| Medium Processing Furnace (MPF) | 60~80 | 30~25 | N-785 |

Soft blacks shown in Table 1 belong to furnace black formed mainly according to the gas furnace process or oil furnace process.

Fine Thermal (FT) of the average particle size 120 to 190 millimicrons and Medium Thermal (MT) of the average particle size 270 to 500 millimicrons also belong to the soft black, but these are not preferable as hereinafter mentioned.

Some of soft blacks shown in Table 1 have a relatively broad average particle size distribution range. If necessary, the average particle size distribution range may be narrowed by sieving or the like according to need.

When carbon black (hard black) having an average particle size less than 40 millimicrons, such as HAF, is used, though the hardness of rubber composition is sufficiently high, both the Mooney viscosity and green strength become too high and the processability is poor, and therefore, the intended objects of the present invention cannot be attained. However, in order to enhance the reinforcing property of the rubber composition of the present invention, such hard black may be added in such a small amount as will not degrade the processability and other properties of the composition of the present invention. When soft black having an average particle size exceeding 100 millimicrons is used, a hardness (JIS) of 92 or more cannot be attained.

In the present invention, soft black having a specific average particle size as mentioned above is used. If this soft black is incorporated in an amount of 55 to 95 parts by weight, preferably 65 to 85 parts by weight, per 100 parts by weight of the rubber, there can be obtained a rubber composition capable of attaining the objects of the present invention. If the amount of soft black is smaller than 55 parts by weight per 100 parts by weight of the rubber, the intended hardness (JIS) of at least 92 cannot be obtained, and if the amount of soft black is larger than 95 parts by weight per 100 parts by weight of the rubber, the Mooney viscosity and green strength become too high, the processability, particularly the mixing processability, is degraded and the intended objects of the present invention cannot be attained.

As the thermosetting resin that is used for the rubber composition of the present invention, there can be mentioned resins which will be cured under application of heat, for example, modified and unmodified phenolic resins such as straight phenolic resins, cashew-modified phenolic resins, oil-modified phenolic resins and cresol-modified phenolic resins, and modified and unmodified cresol resins such as straight cresol resin, cashew-modified cresol resins and oil-modified cresol resins. Of course, thermosetting resins that can be used in the present invention are not limited to those exemplified above. In order to attain high quality and good processability while maintaining high hardness, cresol resins and phenolic resins such as mentioned above are preferred, and especially good results can be obtained when a cashew-modified cresol resin, a cashew-modified phenolic resin, an oil-modified cresol resin or an oil-modified phenolic resin is used.

The amount incorporated of the thermosetting resin is 5 to 30 parts by weight, preferably 10 to 20 parts by weight per 100 parts by weight of the rubber. When the amount of the thermosetting resin is smaller than 5 parts by weight per 100 parts by weight of the rubber, the intended hardness (JIS) standing for Japanese Industrial Standard of at least 92 cannot be obtained, and when the amount of the thermosetting resin is larger than 30 parts by weight, the Mooney viscosity and green strength are too high and the rubber composition cannot be put into practical use because of poor processability.

In order to obtain a rubber composition intended in the present invention, also the sum of the amounts incorporated of the soft black and thermosetting resin should be taken into consideration. Namely, a rubber composition intended in the present invention can be obtained by adjusting the sum of the amounts incorporated of the soft black and thermosetting resin to 60 to 100 parts by weight, preferably 75 to 90 parts weight per 100 parts by weight of the rubber. If the sum of the amounts of both the components is smaller than 60 parts by weight per 100 parts by weight of the rubber, the intended hardness (JIS) of at least 92 cannot be obtained, and if this sum exceeds 100 parts by weight per 100 parts by weight of the rubber, the Mooney viscosity and green strength are too high and no good processability is obtained.

In the composition of the present invention, a curing agent is inevitably incorporated for curing the thermosetting resin. Any of curing agents customarily used for curing thermosetting resins can be used in the present invention. A typical instance is hexamethylene tetramine. If the amount of the curing agent is smaller than 0.1 part by weight per 100 parts by weight of the rubber, thermal curing reaction is hardly caused, and when the amount of the curing agent is larger than 3 parts by weight per 100 parts by weight of the rubber, the curing agent becomes excessive. Accordingly, in the present invention, it is preferred that the curing agent be incorporated in an amount of 0.1 to 3 parts by weight per 100 parts by weight of the rubber.

In the present invention, in addition to the abovementioned indispensable additives, there may be incorporated additives customarily used for rubbers, for example, fillers, antioxidants, softeners, vulcanization activators and tackifires, so far as the hardness and processability characteristics of the rubber composition of the present invention are not degraded.

In the manufacture of the rubber composition of the present invention, the foregoing additives are incorporated in rubber, and mastication, kneading, extrusion molding and curing are carried out by using processing procedures and machines customarily adopted in the field of rubber industry.

In the present invention, it is very important to use soft black having a specific average particle size in addition to specific rubber additives to be used in specific amounts.

Carbon black having an average particle size exceeding 40 millimicrons, for example, soft black having an average particle size of 40 to 80 millimicrons, has not been heretofore used for increasing the hardness, because such carbon black is very poor in the rubber reinforcing effect. When soft black having an average particle size of 40 to 80 millimicrons is used in combination with a thermosetting resin and a curing agent according to the present invention, there can be obtained a rubber composition capable of exerting a very high hardness after curing without degradation of elasticity and break characteristics (strength at break and elongation at break) inherent of rubber. Moreover, at elevated temperatures adopted for processing such as mixing and extrusion, the viscosity of the rubber composition is remarkably reduced by softening of the thermosetting resin and the viscosity-reducing activity of the soft black. Accordingly, the mixing processability, extrusion processability and molding processability of the rubber composition can be prominently improved.

Although the rubber composition of the present invention shows a hardness (JIS) of at least 92 after curing, the Mooney viscosity is less than 60 and the green strength is lower than 10 Kg/cm$^2$ in the uncured state. Because of such specific characteristics, the processability of the rubber composition of the present invention is remarkably improved.

In the rubber composition of the present invention, by this improvement of the mixing processability, the power load on a Banbury mixer can be reduced and an energy saving effect can be attained. Moreover, a good massive state of rubber is retained and a sheet having good surface conditions can be obtained. Furthermore, by the improvement of the extrusion processability, a good self-bonding property is retained and the most fatal defect involved in a conventional rubber composition comprising as main additives carbon black having an average particle size of 20 to 30 millimicrons, a thermosetting resin and a curing agent, that is, a high rigidity of an uncured composition at room temperature, can be substantially eliminated, and the rigidity characteristic of the rubber composition of the present invention is comparable to that of a rubber composition free of a thermosetting resin. Accordingly, when a tire is prepared by using an extrudate of the rubber composition of the present invention, the molding processability can be remarkably improved.

In the rubber composition of the present invention, it is possible to obtain a cured rubber product having a hardness (JIS) of at least 92 without degrading the processability and moldability in the uncured state. If this rubber composition is arranged in a portion of a tire where a high lateral rigidity is required, that is, in a region extending to the side wall of the tire in the tongue-like form, the riding comfortability can be improved without degrading the operation stability and durability of the tire. This effect is especially prominent in case of a radial tire which is relatively poor in the riding comfortability.

Figure 2:
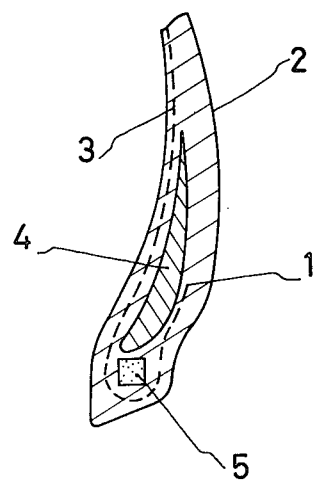

If the conventional tire, as shown in FIG. 1, the top end 1 of a folded portion of a carcass 3 is considerably turned upwardly toward the top end of a side wall portion 2, and the driving stability is maintained by disposing a relatively hard rubber (bead filler 4) between the carcass 3 and the folded portion thereof. In this structure, however, since the bead filler 4 is gripped between the carcass proper and the folded portion of the carcass, the riding comfortability is drastically worsened. This is a main cause of a poor riding comfortability of a radial tire. The riding comfortability of a tire may be improved by locating the top end of the folded portion of the carcass 3 at a low position on the side of a bead 5 as shown in FIG. 2. However, in this case, configuration of the bead filler 4 is surrounded by the carcass 3 and the folded portion thereof.

In the present invention, by using the above-mentioned high hardness rubber composition for the rim cushion portion rubber 6 alone or both the rim cushion portion rubber 6 and bead filler 4, there can be obtained a tire in which the riding comfortability is remarkably improved without degradation of the driving stability and durability of the tire.

The present invention will now be described in detail by reference to the following Examples that by no means limit the scope of the invention. In these Examples, all of "parts" are by weight.

EXAMPLES 1 to 4

Uncured rubber sheets were prepared according to customary procedures by using rubber compositions comprising rubber and additives indicated in Table 2 in amounts indicated in Table 2 while varying the amount of soft black (Fast Extrusion Furnace, FEF) having an average particle size of 40 to 45 millimicrons in a range of 50 to 100 parts as indicated in Table 2. These uncured rubber sheets were cured at 150° C. for 15 minutes, and the JIS Hs hardness was measured on sample sheets having a thickness of 2 mm.

Furthermore, the plasticity of uncured rubber compositions was measured by a Mooney viscometer, and the green strength was measured on uncured rubber sheets cut out by a dumbbell No. 1 of JIS.

Obtained results are shown in Table 2.

TABLE 2

| Components and Properties | Comparative Example 1 | Example 1 | Example 2 | Example 3 | Example 4 | Comparative Example 2 | Comparative Example 3 |
|---|---|---|---|---|---|---|---|
| Incorporated Components (parts) | | | | | | | |
| natural rubber | 50 | 50 | 50 | 50 | 50 | 50 | 50 |
| butadiene rubber | 50 | 50 | 50 | 50 | 50 | 50 | 50 |
| zinc oxide | 10 | 10 | 10 | 10 | 10 | 10 | 10 |
| stearic acid | 2 | 2 | 2 | 2 | 2 | 2 | 2 |
| antioxidant | 1 | 1 | 1 | 1 | 1 | 1 | 1 |
| aromatic oil | 5 | 5 | 5 | 5 | 5 | 5 | 5 |
| cashew-modified cresol resin (R) | 10 | 10 | 10 | 10 | 10 | 10 | 10 |
| soft black (C) | 50 | 55 | 60 | 75 | 85 | 95 | 100 |
| (R + C) | (60) | (65) | (70) | (85) | (95) | (105) | (110) |
| sulfur | 5 | 5 | 5 | 5 | 5 | 5 | 5 |
| vulcanization accelerator | 2.5 | 2.5 | 2.5 | 2.5 | 2.5 | 2.5 | 2.5 |
| hexamethylene tetramine | 1.0 | 1.0 | 1.0 | 1.0 | 1.0 | 1.0 | 1.0 |
| Property | | | | | | | |
| Hardness (JIS) | 87 | 92 | 92 | 93 | 94 | 94 | 95 |
| Processability of Uncured Sheet | | | | | | | |
| Mooney viscosity ($ML_{1+4}$ 100° C.) | 34 | 37.5 | 40 | 50 | 56 | 62.5 | 70 |
| green strength (Kg/cm$^2$) | 4.0 | 4.5 | 5.0 | 6.5 | 8.5 | 11.5 | 14.0 | since the rigidity of the bead filler 4 is insufficient, the tire driving stability and durability are sacrificed for improvement of the riding comfortability.

These defects involved in the conventional tires can be effectively eliminated according to the present invention.

Figure 3:
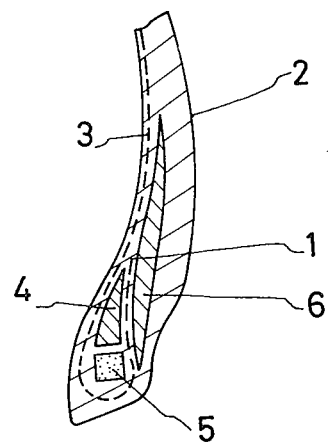
FIG. 3 is a cross-sectional view illustrating a part of a tire according to the present invention in the region of from the bead portion to the side wall.

In order to improve the durability, particularly prevent separation caused from the top end 1 of the folded portion of the carcass 3, in the present invention, as shown in FIG. 3, the folded portion of the carcass 3 is located inside a rim cushion portion rubber 6. The rim cushion portion rubber 6 has a tongue-shaped section extending from the bead portion almost to the center of the side wall. In the embodiment shown in FIG. 3, the top end of the folded portion of the carcass 3 is arranged inside this rim cushion portion rubber 6. The bead filler 4 is arranged between the carcass 3 and the folded portion of the carcass 3 in such a state that the sectional As will be apparent from the data shown in Table 2, if the amount of soft black is in the range specified in the present invention, there can be obtained a rubber composition having a hardness (JIS) of at least 92 in the cured state, and in the uncured state, both the Mooney viscosity and the green strength are low and very good processability can be attained.

EXAMPLES 5 to 7

Uncured rubber sheets were prepared according to customary procedures from rubber compositions comprising rubber and additives in amounts shown in Table 3 while varying the amount of a cashew-modified cresol resin used as the thermosetting resin in a range of from 3 to 35 parts as shown in Table 3 and selecting GPF having an average particle size of 50 to 55 millimicrons as the soft black. These sheets were cured in the same manner as in Example 1, and the physical properties were determined in the same manner as described in Example 1 to obtain results shown in Table 3.

EXAMPLES 12 to 14

Various rubber compositions indicated in Table 5

TABLE 3

| Components and Properties | Comparative Example 4 | Example 5 | Example 6 | Example 7 | Comparative Example 5 | Comparative Example 6 |
|---|---|---|---|---|---|---|
| Components Incorported (parts) | | | | | | |
| natural rubber | 70 | 70 | 70 | 70 | 70 | 70 |
| styrene-butadiene rubber | 30 | 30 | 30 | 30 | 30 | 30 |
| zinc oxide | 10 | 10 | 10 | 10 | 10 | 10 |
| stearic acid | 2 | 2 | 2 | 2 | 2 | 2 |
| antioxidant | 1 | 1 | 1 | 1 | 1 | 1 |
| aromatic oil | 5 | 5 | 5 | 5 | 5 | 5 |
| cashew-modified cresol oil (R) | 3 | 5 | 10 | 20 | 30 | 35 |
| soft black (C) | 75 | 75 | 75 | 75 | 75 | 75 |
| (R + C) | (78) | (80) | (85) | (95) (105) | (110) | |
| sulfur | 5 | 5 | 5 | 5 | 5 | 5 |
| vulcanization accelerator | 2.5 | 2.5 | 2.5 | 2.5 | 2.5 | 2.5 |
| hexamethylene tetramine | 0.3 | 0.5 | 1.0 | 2.0 | 3.0 | 3.5 |
| Property | | | | | | |
| Hardness (JIS) | 89 | 92 | 92 | 94 | 94 | 95 |
| Processability of Uncured Sheet | | | | | | |
| Mooney viscosity ($ML_{1+4}100°$ C.) | 45 | 47 | 50 | 57.5 | 65 | 70 |
| green strength ($Kg/cm^2$) | 5.0 | 5.0 | 5.5 | 8.5 | 12.0 | 15.0 |

From the results shown in Table 3, it will readily be understood that the amount incorporated of the thermosetting resin specified in the present invention is important for attaining the objects of the present invention.

EXAMPLES 8 to 11

Rubber compositions shown in Table 4 were prepared while varying amounts of a cashew-modified cresol resin used as the thermosetting resin and soft black (GPF) having an average particle size of 50 to 55 millimicrons. These compositions were tested in the same manner as in Example 1 to obtain results shown in Table 4.

were prepared by using various carbon blacks differing in the average particle size, and they were tested in the same manner as in Example 1 to obtain results shown in Table 5, from which it will readily be understood that if carbon black having an average particle size of a least 40 millimicrons is used, there can be obtained an intended high hardness rubber composition of the present invention.

TABLE 4

| Components and Properties | Example 8 | Comparative Example 7 | Example 9 | Comparative Example 8 | Example 10 | Example 11 | Comparative Example 9 |
|---|---|---|---|---|---|---|---|
| Components Incorporated (parts) | | | | | | | |
| natural rubber | 50 | 50 | 50 | 50 | 50 | 50 | 50 |
| isoprene rubber (high cis-type) | 50 | 50 | 50 | 50 | 50 | 50 | 50 |
| zinc oxide | 10 | 10 | 10 | 10 | 10 | 10 | 10 |
| stearic acid | 2 | 2 | 2 | 2 | 2 | 2 | 2 |
| antioxidant | 1 | 1 | 1 | 1 | 1 | 1 | 1 |
| aromatic oil | 5 | 5 | 5 | 5 | 5 | 5 | 5 |
| cashew-modified cresol resin (R) | 5 | 10 | 15 | 20 | 25 | 30 | 30 |
| soft black (C) | 95 | 95 | 85 | 85 | 75 | 70 | 75 |
| (R + C) | (100) | (105) | (100) | (105) | (100) | (100) | (105) |
| sulfur | 5 | 5 | 5 | 5 | 5 | 5 | 5 |
| vulcanization accelerator | 2.5 | 2.5 | 2.5 | 2.5 | 2.5 | 2.5 | 2.5 |
| hexamethylene tetramine | 0.5 | 1.0 | 1.5 | 2.0 | 2.5 | 3.0 | 3.0 |
| Property | | | | | | | |
| Hardness (JIS) | 92 | 94 | 92 | 94 | 93 | 93 | 94 |
| Processability of Uncured Sheet | | | | | | | |
| Mooney viscosity ($ML_{1+4}100°$ C.) | 58.5 | 65 | 54 | 66 | 55 | 58 | 63 |
| green strength ($Kg/cm^2$) | 8.5 | 10.5 | 7.0 | 10.5 | 7.5 | 8.0 | 10.5 |

From the results shown in Tables 2 to 4, it will readily be understood that if 55 to 95 parts of soft black, 5 to 30 parts by weight of a thermosetting resin and a curing agent are incorporated into 100 parts by weight of rubber while adjusting the sum of the amounts of the soft black and thermosetting resin to 60 to 100 parts by weight, there can be obtained an intended rubber composition having a hardness (JIS) of at least 92, a Mooney viscosity lower than 60 and a green strength lower than 10 $Kg/cm^2$.

TABLE 5

| Components and Properties | Comparative Example 10 | Example 12 | Example 13 | Example 14 |
|---|---|---|---|---|
| Components Incorporated (parts) | | | | |
| natural rubber | 70 | 70 | 70 | 70 |
| styrene-butadiene rubber | 30 | 30 | 30 | 30 |
| zinc oxide | 10 | 10 | 10 | 10 |
| stearic acid | 2 | 2 | 2 | 2 |
| antioxidant | 1 | 1 | 1 | 1 |

TABLE 5-continued

| Components and Properties | Comparative Example 10 | Example 12 | Example 13 | Example 14 |
|---|---|---|---|---|
| aromatic oil | 5 | 5 | 5 | 5 |
| cashew-modified cresal resin | 10 | 10 | 10 | 10 |
| carbon black | | | | |
| HAF (average particle size of 26 to 28 mµ) | 75 | | | |
| FEF (average particle size of 40 to 45 mµ) | | 75 | | |
| GPF (average particle size of 50 to 55 mµ) | | | 75 | |
| SRF (average particle size of 60 to 80) | | | | 75 |
| sulfur | 5 | 5 | 5 | 5 |
| vulcanization accelerator | 2.5 | 2.5 | 2.5 | 2.5 |
| hexamethylene tetramine | 1.0 | 1.0 | 1.0 | 1.0 |
| Property | | | | |
| Hardness (JIS) | 95 | 93 | 92 | 92 |
| Processability of Uncured Sheet | | | | |
| Mooney viscosity (ML$_{1+4}$100° C.) | 75.0 | 55.0 | 50.0 | 48.0 |
| green strength (Kg/cm$^2$) | 18.0 | 6.5 | 5.5 | 5.0 |

EXAMPLES 15 to 18

Rubber compositions indicated in Table 6 were prepared by using various thermosetting resins shown in Table 6, and these compositions were tested in the same manner as in Example 1 to obtain results shown in Table 6, from which it will readily be understood that excellent results were obtained in each case.

TABLE 6

| Components and Properties | Example 15 | Example 16 | Example 17 | Example 18 |
|---|---|---|---|---|
| Components Incorporated (parts) | | | | |
| natural rubber | 70 | 70 | 70 | 70 |
| styrene-butadiene rubber | 30 | 30 | 30 | 30 |
| zinc oxide | 10 | 10 | 10 | 10 |
| stearic acid | 2 | 2 | 2 | 2 |
| antioxidant | 1 | 1 | 1 | 1 |
| aromatic oil | 5 | 5 | 5 | 5 |
| cashew-modified cresol resin | 10 | | | |
| cashew-modified resin | | 10 | | |
| oil-modified phenolic resin | | | 10 | |
| cresol-modified phenolic resin | | | | 10 |
| soft black (average particle size of 56 millimicrons) | 75 | 75 | 75 | 75 |
| sulfur | 5 | 5 | 5 | 5 |
| vulcnaization accelerator | 2.5 | 2.5 | 2.5 | 2.5 |
| hexamethylene tetramine | 1.0 | 1.0 | 1.0 | 1.0 |
| Property | | | | |
| Hardness (JIS) | 92 | 93 | 92 | 93 |
| Processability of Uncured Sheet | | | | |
| Mooney viscosity (ML$_{1+4}$100° C.) | 50 | 53 | 50.5 | 55 |
| green strength (Kg/cm$^2$) | 5.5 | 6.8 | 6.0 | 7.0 |

EXAMPLE 19

A radial tire (155 SR 13 size) having a structure as shown in FIG. 3 was molded by using the rubber composition of the present invention, which was obtained in Example 6 and had a hardness (JIS) of 92, for the bead filler 4 and rim cushion portion rubber 6 in FIG. 3, and it was attached to an automobile and the durability, driving stability and riding comfortability were tested. Obtained results are shown in Table 7.

For comparison, a tire prepared by using a rubber composition having a hardness (JIS) of 80 for the bead filler 4 in FIG. 1 (Comparative Example 11), a tire prepared by using the above rubber composition for the bead filler 4 in FIG. 2 (Comparative Example 12) and a tire formed by using the above rubber composition for the bead filler 4 and rim cushion portion rubber 6 in FIG. 3 (Comparative Example 13) were similarly tested, and obtained results are shown in Table 7. Each tire had a size of 155 SR 13. The recipe of the rubber composition having a hardness (JIS) of 80, which was used for the comparative tires, was as follows.

| Components incorporated | Parts per 100 parts of rubber |
|---|---|
| natural rubber | 70 |
| styrene-butadiene rubber | 30 |
| zinc oxide | 8 |
| stearic acid | 2 |
| antioxdant | 1 |
| aromatic oil | 8 |
| carbon black HAF | 75 |
| sulfur | 3 |
| vulcanization accelerator | 2 |

TABLE 7

| Hardness and Tire Properties | Comparative Example 11 | Comparative Example 12 | Comparative Example 13 | Example 19 |
|---|---|---|---|---|
| Hardness (JIS) of rubber composition of bead filler | 80 | 80 | 80 | 92 |
| Hardness (JIS) of rubber composition of rim cushion portion rubber | — | — | 80 | 92 |
| Durability (Km) | 7330 | 2346 | 7200 | 8043 |
| Driving stability (Kg) | 180 | 158 | 155 | 184 |
| | (100) | (88) | (86) | (102) |
| Riding comfortability (Kg) | 228 | 181 | 170 | 199 |
| | (100) | (79) | (75) | (87) |

Note:
(1) Each parenthesized value is a relative value calculated based on assumption that the value obtained in Compartive Example 11 is 100.
(2) The durability is expressed in terms of the driving distance (Km) before breakage of the bead portion. Driving test conditions adopted are as follows:
Inner pressure: 1.4 Kg/cm$^2$
Speed: 81 Km/hr
Load: sin-wave varying load of 330 ± $^{100}$ Kg
(3) The driving stability is expressed in terms of the lateral rigidity (Kg) determined under the following conditions:
Inner pressure: 1.9 Kg/cm$^2$
Load: 370 Kg
Lateral displacement: 20 mm
(4) The riding comfortability is expressed in terms of the impact force (Kg) on the projection of the tire determined under the following conditions:
Inner pressure: 1.9 Kg/cm$^2$
Load: 370 Kg
Speed: 60 Km/Hr
Projection: 10 R As will readily be understood from the results shown in Table 7, the tire of Comparative Example 11 is very poor in the riding comfortability (a higher impact force on the projection indicates an inferior riding comfortability), and in the tires of Comparative Examples 12 and 13, though the riding comfortability is improved, the driving stability is extremely bad and in case of the tire of Comparative Example 12, also the durability is poor. In contrast, the tire of the present invention (Example 19) is excellent in not only the durability but also the driving stability and the riding comfortability is maintained at a relatively high level. Accordingly, the tire of the present invention is very excellent collectively.

What we claim is:

1. A high hardness rubber composition having a hardness after curing of at least 92 comprising at least one rubber selected from the group consisting of natural rubber, diene type rubber and diene type copolymer rubber, a single vulcanizing agent for said at least one rubber, soft black, a novolak type phenol or alkylphenol thermosetting resin wherein said single vulcanizing agent is sulfur and and a curing agent for said thermosetting resin, wherein the soft black has an average particle size of 40 to 80 millimicrons, the amount of the soft black is 55 to 95 parts by weight per 100 parts by weight of the rubber, the amount of the thermosetting resin is 5 to 30 parts by weight per 100 parts by weight of the rubber and the sum of the amounts of the soft black and thermosetting resin is 60 to 100 parts by weight per 100 parts by weight of the rubber.

2. A high hardness rubber composition as set forth in claim 1 wherein in the uncured state, the composition has a Mooney viscosity lower than 60 and a green strength lower than 10 Kg/cm$^2$.

3. A high hardness rubber composition as set forth in claim 1 wherein the amount of the curing agent is 0.1 to 3 parts by weight per 100 parts by weight of the rubber.

4. A high hardness rubber composition as set forth in claim 1 wherein the thermosetting resin is a cashew-modified cresol resin.

5. A high hardness rubber composition as set forth in claim 1 wherein the thermosetting resin is a phenolic resin selected from the group consisting of oil-modified phenolic resins, cresol-modified phenolic resins and cashew-modified phenolic resins.

6. A high hardness rubber composition as set forth in claim 1 wherein the amount of the soft black is 65 to 85 parts by weight per 100 parts by weight of the rubber.

7. A high hardness rubber composition as set forth in claim 1 wherein the amount of the thermosetting resin is 10 to 20 parts by weight per 100 parts by weight of the rubber.

8. A high hardness rubber composition as set forth in claim 1 wherein the sum of the amounts of the soft black and thermosetting resin is 75 to 90 parts by weight per 100 parts by weight of the rubber.

9. A rubber composition for the rim cushion portion rubber of a tire, which comprises at least one rubber selected from the group consisting of natural rubber, diene type rubber and diene type copolymer rubber, a single vulcanizing agent for said at least one rubber, soft black, a novolak type phenol or alkylphenol thermosetting resin and a curing agent for said thermosetting resin, wherein said single vulcanizing agent is sulfur and wherein the average particle size of the soft black is 40 to 80 millimicrons, the amount of the soft black is 55 to 95 parts by weight per 100 parts by weight of the rubber, the amount of the thermosetting resin is 5 to 30 parts by weight per 100 parts by weight of the rubber, the sum of the amounts of the soft black and thermosetting resin is 60 to 100 parts by weight per 100 parts by weight of the rubber, the Mooney viscosity and green strength of the rubber composition in the uncured state are lower than 60 and lower than 10 Kg/cm$^2$, respectively, and the post-vulcanization hardness of the rubber composition after curing is at least 92.

10. A tire comprising a carcass including a folded portion formed by folding the carcass at the bead portion toward the outside of the tire and a rim cushion portion rubber having a tongue-shaped section and being extended from the bead portion to the side wall so that said folded portion of the carcass is located axially inside the rim cushion portion rubber, said rim cushion portion rubber consisting essentially of a rubber composition comprising at least one rubber selected from natural rubber, diene type rubber and diene type copolymer rubber, a single vulcanizing agent for said at least one rubber, soft black, a novolak type phenol or alkylphenol thermosetting resin and a curing agent for said thermosetting resin, wherein said single vulcanizing agent is sulfur and wherein the average particle size of the soft black is 40 to 80 millimicrons, the amount of the soft black is 55 to 95 parts by weight per 100 parts by weight of the rubber, the amount of the thermosetting resin is 5 to 30 parts by weight per 100 parts by weight of the rubber, the sum of the amounts of the soft black and thermosetting resin is 60 to 100 parts by weight per 100 parts by weight of the rubber and the post-vulcanization hardness of said rubber composition is at least 92, the tire further comprising a bead filler of a triangular sectional shape extending toward the side wall between the carcass and its folded portion, said folded portion of the carcass extending to the vicinity of the extended end of said bead filler.

11. A tire as set forth in claim 10 wherein the rim cushion portion rubber is extended from the bead portion almost to the center of the side wall.

12. A tire as set forth in claim 10 wherein the thermosetting resin is a cashew-modified cresol resin.

13. A tire as set forth in claim 10 wherein the thermosetting resin is a phenolic resin selected from the group consisting of oil-modified phenolic resins, cresol-modified phenolic resins and cashew-modified phenolic resins.

14. A tire comprising a carcass including a folded portion formed by folding the carcass at the bead portion toward the outside of the tire, a rim cushion portion rubber having a tongue-shaped section and being extended from the bead portion to the side wall so that the folded portion of the carcass is located axially inside the rim cushion portion rubber, and a bead filler of a triangular sectional shape extended toward the side wall between the carcass and the folded portion of the carcass, said folded portion of the carcass extending to the vicinity of the extended end of said bead filler, said rim cushion portion rubber and said bead filler consisting essentially of a rubber composition comprising at least one rubber selected from the group consisting of natural rubber, diene type rubber and diene type copolymer rubber, a single vulcanizing agent for said at least one rubber, soft black, a novolak type phenol or alkylphenol thermosetting wherein said single vulcanizing agent is sulfur and resin and a curing agent for said thermosetting resin, wherein the average particle size of the soft black is 40 to 80 millimicrons, the amount of the soft black is 55 to 95 parts by weight per 100 parts by weight of the rubber, the amount of the thermosetting resin is 5 to 30 parts by weight per 100 parts by weight of the rubber, the sum of the amounts of the soft black and thermosetting resin is 60 to 100 parts by weight per 100 parts by weight of the rubber and the post-vulcanization hardness of said rubber composition is at least 92.

15. A tire as set forth in claim 14 wherein the rim cushion portion rubber is extended from the bead portion almost to the center of the side wall.

16. A tire as set forth in claim 14 wherein the thermosetting resin is a cashew-modified cresol resin.

17. A tire as set forth in claim 14 wherein the thermosetting resin is a phenolic resin selected from the group consisting of oil-modified phenolic resins, cresol-modified phenolic resins and cashew-modified phenolic resins.

* * * * *